United States Patent [19]

Smith et al.

[11] 3,879,561

[45] Apr. 22, 1975

[54] VACUUM DRIED CONDIMENTS

[75] Inventors: Richard G. Smith, Arlington Heights; James K. Stewart, Palatine, both of Ill.

[73] Assignee: A. E. Staley Manufacturing Company, Decatur, Ill.

[22] Filed: May 30, 1972

[21] Appl. No.: 257,525

[52] U.S. Cl. ............... 426/533; 426/656; 426/661
[51] Int. Cl. .............................................. A23l 1/26
[58] Field of Search ............ 99/140 R; 426/65, 175, 426/221, 471, 380, 364, 212, 213, 215

[56] References Cited
UNITED STATES PATENTS

| | | | |
|---|---|---|---|
| 2,446,478 | 8/1948 | Kremers | 99/140 R |
| 2,835,592 | 5/1958 | Rusoff | 99/140 R |
| 3,480,447 | 11/1969 | Hack et al | 99/140 R |
| 3,620,772 | 11/1971 | Kitada et al | 426/65 |

*Primary Examiner*—Raymond N. Jones
*Assistant Examiner*—Esther L. Massung
*Attorney, Agent, or Firm*—M. Paul Hendrickson; Charles J. Meyerson

[57] ABSTRACT

Condiment particulates, exhibiting distinctive meat flavor and aroma characteristics, are obtained by simultaneously drying and reacting under subatmospheric pressure and at a elevated temperature an aqueous medium which contains amino acids and/or protein hydrolyzates in conjunction with starch hydrolyzates as major dry solid components. The starch hydrolyzate portion is comprised of dextrins and reducing sugars. The aqueous medium having a solids to water ratio of at least 2:1 is vacuum dried to a moisture content of less than 4% by weight granulated and fat coated.

20 Claims, No Drawings

3,879,561

VACUUM DRIED CONDIMENTS

BACKGROUND OF THE INVENTION

Certain condiments have heretofore been prepared by browning reactions. Browning reactions are complex in that minor changes in the process or ingredients will generally lead to significantly different flavor development. One type of browning (caramelization), occurs when polyhydroxycarbonyl compounds are heated to relatively high temperatures in the absence of amino compounds. However, the most common type of browning is the carbonyl-amino reactions which include the reactions of aldehydes, ketones and reducing sugars with amines, amino acids, peptides and proteins. Compounds that engender browning usually contain a carbonyl or a potential carbonyl grouping. Sugars are examples of naturally occurring compounds that can yield a multiplicity of carbonyl groups. In the browning reaction, the reducing sugars are transformed (by dehydration and/or freezing) to enediols and osones, and to reductones and dehydro reductones which provide $\alpha$-dicarbonyl or conjugated dicarbonyl groups and color.

An early patent (U.S. Pat. No. 2,305,940 by Walsh) discloses spray-dried products obtained via the browning reaction between reducing sugars and hydrolyzed proteins. Pursuant to the patent teachings, the browning reaction may be conducted prior or after spray drying. In Canadian Pat. No. 840,385, dried products possessing a flavor similar to meat extracts are prepared by reacting reducing sugars with protein hydrolyzates and aminoalkanesulfonic acids. In the Canadian Patent, the browning reaction is conducted under aqueous conditions for a period of time sufficient to completely react all the available reducing sugar at temperatures of about 90°C.–110°C. Upon completion of the browning reaction, the browned product is dried.

Recognizing the difficulty in providing an appropriate condiment flavor in spray-dried products, U.S. Pat. No. 3,592,981 proposes to ferment whey with a lactose preparation and admix the resultant ferment with hydrolyzed vegetable proteins and salt. The admixture is then subjected to Maillard browning reaction and spray-dried to provide a dry soy sauce condiment.

The art's attempt to employ dry condiments as a liquid substitute has been fraught with many problems. In general, spray-dried condiments have an extremely fine particle size. This creates problems especially when the spray-dried particles are dry blended with other dry mix additives. During dry blending, these fine particles create a serious dusting problem. Moreover, the fine particle size significantly increases stratifying problems in relation to the other dry blend ingredients during mixing and packaging operations. Similarly, considerable difficulties have been encountered in maintaining mix homogeneity in the packaged product containing the spray-dried condiments. Thus, during transit, the spray-dried condiments tend to separate from the other mix ingredients which adversely affects the quality of the reconstituted mix and the recipe tolerance. Attempts to increase the particle size of spray-dried condiments via agglomeration techniques have not afforded a solution to the problem. The inherent characteristics and composition limits adaptability to conventional agglomeration processes. These problems make it extremely difficult to provide the consumer with a blend of a uniform consistency and composition.

The high degree of hygroscopicity, tendency to lump and ball during dry blending and reconstitution, poor flavor and aroma and color characteristics, packaging difficulties, inability to consistently control the condiment quality and uniformity under commercial processing conditions, lack of compatability with other seasoning ingredients and mix ingredients, separate packaging requirements have limited the commercial acceptance of spray-dried condiments as a suitable replacement for liquid condiments.

OBJECTS

It is an object of the present invention to provide a method for preparing condiments by a browning reaction.

An object of the present invention is to provide a dry, condiment, base mix useful as a seasoning agent or seasoning adjunct.

Another object of the present invention is to provide a method whereby the browning and drying reaction may be conducted simultaneously.

An additional object of the present invention is to provide a dry, particulate, base condiment composition which can be easily admixed with other dry blend ingredients and packaged in a single container without being susceptible to separation therefrom.

A further object of the invention is to provide a dry condiment possessing distinctly different flavor characteristics.

A still further object of the invention is to provide dry, condiment, base compositions exhibiting significantly improved resistance towards dusting, moisture pick-up and lumping.

DISCLOSURE OF THE INVENTION

According to the present invention, there is provided a method for preparing edible, condiment particulates, said method comprising the steps of:

A. providing a uniform, aqueous medium comprised of:
  a. water,
  b. a proteinaceous portion containing at least one proteinaceous member selected from the group consisting of an $\alpha$-amino acid, a protein hydrolyzate and the salts of said $\alpha$-amino acids and protein hydrolyzates,
  c. a carbohydrate portion containing starch hydrolyzates as a major carbohydrate constituent with at least 5% by weight of said carbohydrate portion being a fermentable sugar, said uniform, aqueous medium having a dry solids to water weight ratio of at least 2:1 to less than about 9:1 with the combined dry solids weight of said protein portion and said carbohydrate portion being the major dry solids of said aqueous medium;

B. thermally treating the aqueous medium under subatmospheric pressure at a temperature ranging from about 125°F. to about 280°F.;

C. drying and reacting the protein portion and carbohydrate portion of the aqueous medium under the conditions of step (B) above for a period of time sufficient to reduce the total water content of said aqueous medium to less than 4% by weight; and D. granulating the resultant dried mass into a multiplicity of free-flowing, condiment particulates.

The browning reaction (frequently referred to by the art as "Maillard reaction") imparts unique color and flavor characteristics to the dried condiments by the method herein disclosed. The protein portion provides the required amine groups with the carbonyl groups being provided by the carbohydrate portion.

The α-amino acids, the peptides obtained by the partial or complete hydrolysis of either animal or plant proteins and salts of the α-amino acids and/or protein hydrolyzate may be used as an amine source for the Maillard reaction herein. In general, hydrolyzed proteinaceous materials having a protein content of at least 25% by weight from animal and plant sources are suitable. Typical protein hydrolyzates range from defatted leguminous seed materials (e.g., defatted soya flakes) to protein isolates substantially free from non-protein constituents. Accordingly, hydrolyzed vegetable proteins (wherein protein is a functional constituent on a weight basis) from corn, wheat, rye, barley, oats and soya protein, etc. may be used as the protein portion component. Likewise, the protein portion may be comprised of yeast hydrolyzates (e.g., torula). The hydrolyzed proteins are generally obtained via enzymatic, alkaline or acid hydrolyses. The reaction products derived from the acid hydrolysis and subsequent caustic neutralization of defatted leguminous seed materials having a protein content of at least 35% such as defatted soybean flakes (usually between about 45 to about 55% protein) are particularly suitable. These reaction products are conventionally formulated with added salt and sweetener (e.g., corn syrups) and distributed to the trade as a soy sauce. These soy sauces are commercially available in both the liquid and dry form. Further illustrative protein hydrolyzates and amino acids and salts thereof useful in practicing the present invention may also be found in an article entitled Dehydrated Foods — Chemistry of Browning Reactions in Model Systems by John E. Hodge, *Agricultural & Food Chemistry*, Vol. 1, No. 15, pages 928–943; Canadian Pat. No. 840,385 issued Apr. 28, 1970; U.S. Pat. No. 3,552,981 by Luksas and 2,305,940 by Walsh.

On a dry solids weight basis, an essential portion of the proteinaceous portion is comprised of at least one member selected from the group consisting of α-amino acids, the alkaline salts of amino acids, a protein hydrolyzate and the alkaline salts of protein hydrolyzates. Pursuant to the present invention, a proteinaceous portion is defined as proteinaceous materials which have a protein content of at least 25% by weight excluding non-proteinaceous additives which do not constitute a part of the unhydrolyzed protein material composition. For example, the proteinaceous portion of soy sauce derived from defatted soybean flakes is equivalent to the initial protein content of the unhydrolyzed vegetable protein since hydrolysis thereof does not significantly alter the total nitrogen content. Accordingly, added sugars, alkali and salts employed to provide a final formulated soy sauce product are not considered in calculating the protein content of the proteinaceous portion. Aqueous medium containing hydrolyzed plant proteins (particularly soya and yeast protein hydrolyzates and soy sauces) provide condiment products possessing exceptional flavor and aroma characteristics.

In the present invention, the carbohydrate portion and the protein portion jointly provide the dry solids bulk of the aqueous medium (on a weight basis). The dry solids weight ratio of protein hydrolyzates to carbohydrates employed in preparing the condiments herein may broadly range from about 20:1 to about 1:5.

The carbohydrate portion is generally comprised of a plurality of diverse carbohydrates ranging from monosaccharides to higher molecular weight starch hydrolyzates such as dextrin. Illustrative carbohydrates include the fermentable sugars (i.e., those having a degree of polymerization ranging from one to three saccharide units) such as the monosaccharides (e.g., dextrose, fructose, etc.), the disaccharides (e.g., maltose, lactose and sucrose) and the trisaccharides (e.g., maltotriose). Enhanced flavor development is achieved when at least a major weight portion of the fermentable sugar is comprised of the starch hydrolyzate reducing sugars (e.g., dextrose and maltose). Corn starch hydrolyzates ranging from those having a relatively low fermentable sugar content (e.g., maltodextrin) to those of a high F.E. value (e.g., 90–98% F.E.) may be used herein as a starch hydrolyzate source.

In general, the aqueous medium on a total protein and carbohydrate dry weight basis should contain at least 1% reducing sugar and preferably more than 5% by weight to less than about 30% by weight. Dextrose as the major reducing sugar component has been found to provide a product possessing an exceptional condiment flavor when prepared under the process conditions of the present invention.

In addition to the reducing sugars, it has been found that the presence of an effective amount of dextrin and/or maltodextrins as a carbohydrate component will significantly improve the overall flavor, color and structural characteristics of the dried condiments herein. To the artisan, starch hydrolyzates having a D.E. up to 13 are commonly referred to as dextrins with those having a D.E. from 13 to less than 28 being classified as malto-dextrins. These high saccharides (i.e., dextrins and maltodextrins) possess cohesive and adhesive properties and therefore function as a carrier and binding agent for the condiments of the present invention. They also enhance the final product's resistance towards attrition. The maltodextrins and/or dextrins may be provided in the aqueous medium in a purified form (e.g., as obtained under carefully controlled hydrolyzate conditions to provide a hydrolyzate product substantially free from saccharides having a D.P. of less than 8 or by fractionation processes). Likewise, starch hydrolyzates having a wide saccharide distribution and containing a substantial amount of either maltodextrin and/or dextrins, may be utilized as a carbohydrate source. On a total carbohydrate portion weight basis, either the dextrin and/or maltodextrin should constitute a principal ingredient. Improved results are achieved when dextrin is the principal carbohydrate component of the aqueous medium and particularly when it is the major carbohydrate component.

The addition of an edible, water-soluble salt to the aqueous medium significantly improves the overall properties of the dried condiments. Salt increases the desired structural attributes of the condiment product and also reduces its tendency to lump. These benefits are primarily due to the functionality of the salt during the drying and reaction stage. Maintaining a uniform distribution of the solids, heat transfer and evaporation of water from the aqueous medium is apparently closely related to its salt content. In general, vegetable protein hydrolyzates which are prepared by alkaline pH adjustment will usually contain a substantial amount of salt (e.g., from about 25 to about 50% by weight salt). Such vegetable protein hydrolyzates may be used as a salt source herein. Likewise, sodium chloride may be added to the aqueous medium. The amount of salt employed in preparing the condiment base composition herein will usually be at least 15% to above 50% (total dry solids weight basis). Above 50%, the product is too saline. Advantageously, the salt content will range from about 25% to about 45% (preferably about 30–40%) of the total base composition dry solids weight.

The pH conditions of the aqueous medium during the browning reaction will have a pronounced effect upon flavor development. Color development in the final product is accentuated by conducting the process under alkaline pH conditions but the desired flavor characteristics are reduced thereby. In order to obtain a more complete flavor development without creating undesirable or off-flavors, the pH should usually be between the range of about 4 to less than 7. Development of meaty flavors are best achieved at a pH between about 4.8 and 5.5.

A small added amount of fat (including oils) to the aqueous medium is also useful in improving the overall condiment characteristics. Under the vacuum and heat conditions employed herein, fats provide a more plastic and molten aqueous medium. They also improve the heat transfer and evaporation characteristic of the aqueous mass. Condiments prepared from those containing a small amount of fat are more dense than those prepared in the absence of fat. The fat also functions as a lubricant which aids the subsequent granulation thereof while significantly reducing its dustiness during grinding. If fat is added, the amount will generally range from about 0.5 to 5% by weight of the total dry solids weight and preferably between about 1% to about 3%. Although both liquid fats (i.e., oils) and fat solids may be used, those fats having a melting point above 120°F. tend to impart a greasy texture to the product. Those fats having a melting point between about 80°F. to about 110°F. are preferred as an aqueous medium additive.

Other additives may be admixed with the protein, carbohydrate, fat and salt ingredients mentioned above. Illustratively, other additives include flavor imparting agents (e.g., the natural occurring condiments such as spices and chemical compounds which impart condiment flavoring), coloring agents, preservatives, surface active agents, etc. If desired, proteinaceous flavoring agents such as yeast extracts may be employed. The aqueous medium most suitably contains less than 10% by weight of nonhydrolyzed starch and hydrophilic film formers (e.g., starches, pregelled starches, polysaccharide hydrocolloids, film forming proteins, etc.).

The condiments of the present invention are prepared by providing a uniform or homogeneous admixture of the aforementioned ingredients with a sufficient amount of water to insure a uniform admixture thereof. In order to provide an aqueous medium suitable for drying and browning treatment herein, the dry solids to water weight ratio will range from at least 2:1 to less than 9:1. The admixing of the solids and water may be conducted by conventional, high viscosity mixing devices such as employed in mixing bakery doughs.

The uniform admixture is then subjected to subatmospheric pressures at a temperature ranging from about 125°F. to about 280°F. Under these conditions, the aqueous admixture mass is dehydrated with a concomitant "Maillard reaction" occurring between the protein and carbohydrate portions. In general, the subatmospheric pressures are less than 10 inches of mercury (absolute). The flavors and color of the resultant condiments prepared in accordance with the present invention are significantly improved by employing a subatmospheric pressure greater than 0.5 inch but less than 5.0 inches and particularly good results are obtained between about 1 to about 3 inches mercury absolute. When the aqueous mass has a temperature slightly above 125°F., the browning reaction proceeds at an excessively slow rate. Conversely, at an aqueous medium temperature above 220°F., the process is difficult to control which in turn can easily result in charring and adverse flavor and aroma development. An aqueous medium temperature between 140°F. to 180°F. has been found to impart highly desirable flavor and color characteristics to the condiment product.

The "Maillard reaction" is allowed to continue under the aforementioned subatmospheric pressure and temperature conditions for a period of time sufficient to reduce the total moisture content of the aqueous admixture to less than 4% by weight. Substantially all of the desirable color and flavor development are imparted to the condiment product during the period of thermal treatment at subatmospheric pressure when the aqueous medium in solids content is within the range of about 80 to 96%. However, more complete flavor development is achieved by permitting the reaction and solids content to be conducted under conditions whereby the water content is reduced from a value of at least 15% by weight to less than 4%. Within this range, more desirable flavors and aromas are produced comparative to those processes wherein the moisture content is only reduced from a value of about 10% (i.e., the solids content of 90%) to less than 4%. Apparently, the solids content and thermal treatment are dependent factors in leading to a more complete flavor and aroma development. For these reasons, the uniform aqueous admixture should initially contain from 15–25% water as a volatile carrier followed by drying and permitting the reaction to continue until the aqueous admixture has a moisture content of less than 4%. Below the 4% moisture level (e.g., about 3.5% or less), the development of desirable flavorable components and browning effect is significantly reduced. More distinctive flavor and color attributes are obtained by conducting the simultaneous dehydration and Maillard reactions under conditions wherein the uniform aqueous admixture moisture content is reduced from at least about a 20% water level to less than 4%.

During the simultaneous drying and Maillard reaction conditions herein, the process conditions should be carefully controlled to maintain homogeneous and uniform distribution of the solids. The problems of maintaining a homogeneous mass is obviated by initially thoroughly admixing and uniformly distributing the solids constituents in the aqueous medium at a solids concentration of about 75 to about 85 followed by placing the resultant uniform mass onto the vacuum drying trays in a manner such that its thickness ranges from about ¼ inch to about 1 inch. The method may be conducted in conventional continuous belt or tray type vacuum driers. For best results, the aqueous medium should be dried to about a 1–2% moisture content. Below 1% moisture level, the product tends to char and develop off-flavors.

After completion of the drying and browning reaction, the resultant dry mass is removed by the vacuum drying equipment and granulated. Conventional granulating and grinding devices equipped with particle control means are suitable for this purpose. The grinding conditions are generally conducted under conditions sufficient to provide a granulated product substantially free from particles less than 100 microns. It is advantageous to grind the particle size within the range of about 100 to about 1,000 and preferably within the 200 to 800 range.

The condiment particles are improved by dry blending the granulated condiment particles with fat. Dry blending of the condiment particles effectively coats the particles with a thin fat layer and partially agglomerates the fines to a larger particle size. The fat coated condiment particles are less hygroscopic and significantly less dusty comparative to condiment particles which are not coated with fat. The fat coated particles also are more resistant to particle attrition such as normally encountered in conventional dry blending operations. The fat coated particles can be easily and conveniently admixed with other conventional seasoning additives such as onion powder, garlic, spices, bodying agents (e.g., cold or hot water dispersible starches, proteins, etc.). Without requiring a separate package, the fat coated condiment particles may also be admixed with other culinary dry mix additives. Upon reconstitution with an aqueous medium, the condiments provide unique flavor and aroma characteristics substantially free from undesirable bitter and other adverse flavors and aromas. Quality control in preparing a particular condiment product under commercial process conditions is easily accomplished.

Animal and vegetable fats and/or oils such as mentioned hereinbefore may be used to coat the condiment particles. The amount of fat employed should be sufficient to provide particulates having a thin, uniform fat content. Excessive fat (e.g., more than 5% of the condiment total weight) tends to create greasy flavor and reduce the desired free-flowing attributes. Although from about 0.5 to 5.0% (based upon total condiment particle and fat coating weight) may be used, the most satisfactory results are achieved when the fat coating comprises from about 1 to about 3% by weight of the total fat-coated, condiment weight.

Similar to monosodium glutamate, the condiments are particularly useful in those foods wherein it is desired to intensify or impart a meaty flavor or taste to a culinary product. Illustrative uses of the condiment herein include snacks, the vegetable and meat soups, gravies, barbecue sauces, onion and garlic seasoned products, pickle relish, mustard, catsup, soya sauce, chili sauce, meat extracts, etc.

Spray-dried condiments are significantly more hygroscopic than the present condiments. Accordingly, the condiments herein are much more suitably adapted for use in conjunction with those spices requiring packaging at extremely low moisture levels to preserve their good quality. Moreover, the fat coating inhibits accumulation of surface moisture and retains the desired free-flowing characteristics of the blend. Similarly, the fat coating significantly reduces ambient vapor moisture adsorption and adsorption comparative to spray-dried condiments of a comparable composition. This enables the manufacturer to safely dry blend the condiments herein with other dry ingredients and package the desired product under ambient conditions without requiring elaborate and costly control of the humidity conditions for the processing thereof.

The following examples are merely illustrative and should not be construed as limiting the scope of the invention.

EXAMPLE 1

The following ingredients were charged into a conventional steam jacketed, mixing vessel:

| Ingredients | Pounds |
| --- | --- |
| Hydrolyzed vegetable protein[1] | 1,860 |
| Dextrin | 360 |
| 24 D.E. Corn Syrup Solids[2] | 381 |
| Dextrose | 27 |
| Sodium Chloride | 318 |
| Caramel Coloring, 35 Be | 50 |
| Water | 1,200 |

[1]Staley 15 HVP Sauce manufactured and distributed by A. E. Staley Manufacturing Company, Decatur, Ill. An acid hydrolyzed, defatted soybean grit base, neutralized with caustic containing approximately 17.5% by weight sodium chloride and a total nitrogen content of about 2.5%.
[2]STAR-DRI 24R Corn Syrup Solids manufactured and distributed by A. E. Staley Mfg. Co., Decatur, Ill., having an approximate composition of: 5% dextrose, 8% maltose, 10% maltotriose, 38% D.P. 4–9, 15% D.P. 10–30, and 24% D.P. higher than 30.

The ingredients were heated to 190°F. and mixed to a uniform, homogeneous consistency. The uniform admixture was then cooled to 140°F. and evaporated to an 80% dry solids and 20% water content in a Blaw-Knox Rotovac operated at a 140°F., a pump setting of about 12 and at 25 inch mercury.

The uniform admixture was then deposited on vacuum drier pans at a thickness of approximately 0.5 ± 0.25 inch. The vacuum pans were then placed in a vacuum drier. Without foaming and applying external heat, the vacuum was slowly reduced to 3 inches mercury (absolute). Heat was then applied while maintaining the product under vacuum.

Steam pressure in the heating coils was controlled throughout at between 5–8 p.s.i. (gauge). During the first hour of vacuum drying, the reaction product exhibits a high degree of turbulence (e.g., molten, viscous, boiling mass) and vigorous dehydration. After one hour of treatment, the product starts to crust and solidify. The vacuum was increased at this stage of drying to about one inch (absolute). After a total of 3 hours, the steam valve was disengaged and the reacted product was allowed to dry for an additional hour at one inch mercury (absolute). The dried product was then removed from the vacuum drier. The dried mass was allowed to cool under ambient conditions for 30 minutes. The cooled product was ground, employing a Fritzpatrick Model D comminutor using No. 2AA screen with the knives set in a forward position.

| Ground Product Analysis | |
| --- | --- |
| pH (3% solution) | 5.1 |
| Sodium Chloride | 36% by weight |
| Total Water Content[3] | 2% by weight |
| Color | Brown |
| Protein[4] | 14% |
| Granulation | 100% through U.S. No. 14 Sieve |

[3]Vacuum oven method at 80°C., 100 mm. mercury (absolute) for 10 hours.
[4]Kjeldahl, 800 ml flask. Factor 6.25.

A 1500-pound batch of the ground condiment was dry blended with 15 pounds of fat ("Durkex 500," a partially hydrogenated vegetable oil manufactured by Glidden-Durkee Foods Co.) in a ribbon blender.

The resultant condiment exhibited a unique meaty flavor and aroma without any detectable bitter or off-flavors. The condiment had an excellent reddish-brown color. The product was substantially non-dusty and free-flowing. The condiment was easily dry blended with other seasoning ingredients (e.g., a blend of starch, onion powder, granular starch, spices, and dehydrated tomatoes) to provide a uniform blend thereof without stratification or lumping. The seasoned condiment product was combined with seared ground beef, water, and rice and simmered for fifteen minutes to provide a uniquely flavored cooked product.

For comparative purposes, the above solid ingredients were employed to prepare a conventional spray-dried product. The resultant spray-dried condiment product was considerably more bland with a less meaty taste. Considerable dusting, lumpiness and stratification was encountered in attempts to dry blend the spray-dried product with other seasoning additives. These negative dry blending characteristics also occurred during attempts to dry blend the spray-dried product with fat. Employing conventional dry blending, the maximum amount of fat which could be incorporated into the spray-dried product without bridging was about 0.5% as opposed to about 5% for the granulated product of the invention.

EXAMPLE 2

In this Example, the aqueous medium ingredients of Example 1 were employed with the exception of the addition of 1% fat (admixed at the 80% solids level). The aqueous medium was then dried in a continuous band, vacuum oven drier. Four drying zones under 2.24 inches mercury (absolute) were employed with Zone 1 being maintained at 255°F., Zone 2 at 240°F., Zone 3 at 190°F., and Zone 4 at 150°F. Treatment in each zone was for 12 minutes. The resultant condiment mass was granulated and fat coated as in Example 1. The product exhibited properties similar to the vacuum-dried product of Example 1.

What is claimed is:

1. A method for preparing an edible condiment base composition possessing a meaty flavor and suitable for use as a condiment additive in dry culinary mixtures or as a seasoning adjunct in combination with other seasoning agents, said method comprising the steps of:
   A. providing a uniform, aqueous medium comprised of:
      a. water,
      b. a proteinaceous portion of at least one protein member selected from the group consisting of an alpha-amino acid, a protein hydrolyzate, alpha-amino acid salt and protein hydrolyzate salt,
      c. a carbohydrate portion containing a starch hydrolyzate as a principal carbohydrate constituent with at least 5% by weight of said carbohydrate portion being a fermentable sugar,
   wherein on a dry solids weight basis the protein portion and said carbohydrate portion are the major dry solids (on a weight basis) of said aqueous medium and the aqueous medium contains at least 10% by weight water and having a pH between the range of about 4 to less than 7;
   B. simultaneously drying and reacting together the protein portion and carbohydrate portion under subatmospheric pressure at a temperature ranging from about 125°F. to about 280°F. for a period of time sufficient to reduce the total water content of the aqueous medium to less than 4% by weight and thereby provide a dried mass having a meaty flavor; and
   C. granulating the resultant dried mass into a multiplicity of free flowing, condiment particles.

2. The method according to claim 1 wherein the principal carbohydrate ingredient (on a dry weight basis) is comprised of at least one member selected from the group consisting of dextrin and malto-dextrin.

3. The method according to claim 2 wherein the proteinaceous portion is a hydrolyzed vegetable protein having a protein content of at least 35% by weight.

4. The method according to claim 3 wherein the carbohydrate portion consists essentially of starch hydrolyzates with a major portion of the fermentable sugars (on a dry weight basis) being dextrose.

5. The method according to claim 4 wherein an aqueous medium having a solids to water weight ratio between about 3:1 to about 17:3 and a pH of between about 4.8 and 5.5 is subjected to the simultaneous drying and reacting conditions of step (B).

6. The method according to claim 5 wherein thesimultaneous reacting and drying of the carbohydrate portion and protein portion in step (B) is conducted at a temperature between 140°F. to about 180°F. under a vacuum ranging from about 1 to about 3 inches of mercury (absolute).

7. The method according to claim 2 wherein the aqueous medium has total salt concentration on a total dry solids basis ranging from about 25% to less than 50% by weight.

8. The method according to claim 1 which comprises the additional step of coating the condiment particulates with a fat to provide a substantially non-dusty, free-flowing, particulated condiment having an external fat coating.

9. The method according to claim 8 wherein a weight ratio of condiment particles to fat ranging from about 200:1 to about 20:1 are dry blended together to provide a fat coated condiment particulate composition characterized as being substantially free from particles smaller than a 200 mesh screen size (U.S. size).

10. The method according to claim 9 wherein an aqueous medium having a solids to water ratio between about 3:1 to about 17:3 is subjected to simultaneously reacting and drying of step (B) at a temperature greater than 140°F. up to about 180°F. and under a vacuum ranging from about 1 to about 4 inches of mercury absolute.

11. The method according to claim 10 wherein dextrin is the principal starch hydrolyzate with at least a major portion of the fermentable sugar therein being dextrose.

12. The method according to claim 11 wherein the aqueous medium contains from about 15 to about 50% by weight salt.

13. The method according to claim 12 wherein the aqueous medium contains on a dry solids weight basis from about 1 to about 3% by weight fat.

14. The method according to claim 11 wherein the protein hydrolyzate consists essentially of a hydrolyzed vegetable protein.

15. The method according to claim 14 wherein the hydrolyzed vegetable protein consists essentially of a hydrolyzed soya protein.

16. The condiment composition prepared in accordance with the method of claim 1.

17. The condiment composition prepared in accordance with the method of claim 3.

18. The condiment composition prepared in accordance with the method of claim 8.

19. The condiment composition prepared in accordance with the method of claim 12.

20. The condiment composition prepared in accordance with the method of claim 13.

* * * * *